G. H. DAY.
WATCHMAKER'S LOUPE.
APPLICATION FILED DEC. 17, 1910.
1,065,346.
Patented June 24, 1913.
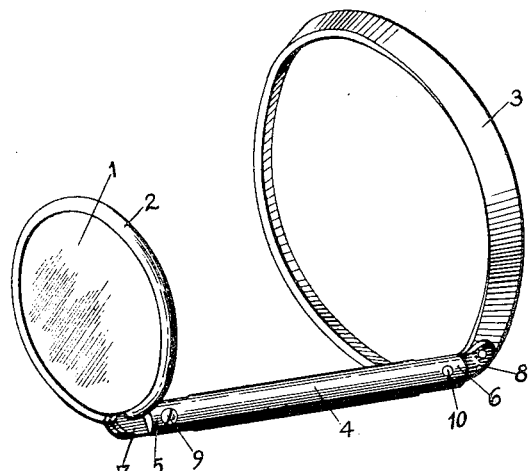
FIG. I
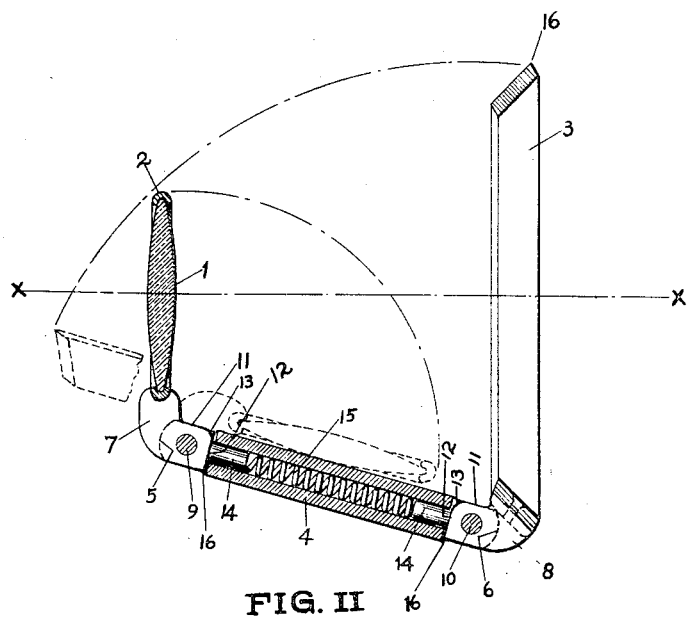
FIG. II
WITNESSES:
Joseph J. Demers
Edwyn E. Sabin
INVENTOR
GEORGE H. DAY
BY Harry H. Styll
ATTORNEY

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

WATCHMAKER'S LOUPE.

1,065,346.　　　　Specification of Letters Patent.　　Patented June 24, 1913.

Application filed December 17, 1910. Serial No. 597,820.

*To all whom it may concern:*

Be it known that I, GEORGE H. DAY, a citizen of the United States, residing at Southbridge, in the county of Worcester and State of Massachusetts, have invented certain new and useful Improvements in Watchmakers' Loupes, of which the following is a specification.

My invention relates to watchmakers' loupes which are used by watchmakers, jewelers and others who require a magnifying glass which can be held in place in front of the eye by contraction of the adjacent muscles, and in which a skeleton frame is employed with its parts so hinged together that it may be compactly folded and carried in the pocket.

My invention comprises a frame adapted to retain the magnifying lens, a male hinge portion on the lens frame, a frame adapted to be held in front of the eye and having a male hinge portion, a connecting member pivotally attached at its opposite ends to the hinge portions of the lens frame and the eye frame, respectively, and yielding means within the connecting member adapted to engage the male hinge portions of the lens frame and the eye frame and support them either in extended or folded position, as the case may be.

The principal object of my invention is to provide improved and neater appearing means for pivotally connecting the lens frame and the eye frame.

Another object of my invention is to provide a tapered or flaring eye frame having a sharp edge for engaging the flesh about the eye.

With these and other objects in view, the invention consists in the novel construction and arrangement of parts hereinafter described, delineated in the drawings and specifically claimed, it being understood that changes properly falling within the scope of what is claimed may be made without departing from the spirit of the invention.

Similar numerals of reference are employed to denote corresponding parts throughout the several figures of the drawings.

In the accompanying drawings: Figure I is a perspective view showing the parts extended for use. Fig. II is a sectional elevation showing in detail the connecting member and the means for supporting the lens frame and eye ring in extended or folded positions.

A magnifying lens 1 held in a frame or rim 2 and an eye frame 3 are pivotally connected by a hollow member or tube 4, the ends of which are recessed to form the projecting ears 5 and 6 of female hinge portions. The male hinge portions 7 and 8 on the lens frame and eye frame which are respectively inserted between the ears 5 and 6 and pivoted by the hinge pins 9 and 10 have flat or straight edges 11 and 12 respectively adapted to lie at right angles to the longitudinal center line of the connecting tube 4 when the lens frame and eye frame are folded down or extended for use. These flat surfaces 11 and 12 are connected by a rounded shoulder 13 to prevent undue wear of the parts when the lens frame and eye ring are rotated from folded to extended position and vice versa. The lens frame and the eye frame are supported in either the folded or extended position by plungers 14 within the connecting tube 4 which are yieldingly pressed against the flat surfaces 11 and 12 as the case may be, of the male hinge portions 7 and 8 by a spiral spring 15 located between them in the tube.

The eye frame 3 which may be made of metal, hard rubber, zylonite or other material, and may be made either rigid or flexible, as desired, is a tapered or flaring annulus provided with a sharp edge 16 adapted to aid the muscles about the eye in retaining the ring in place.

The method of operation is as follows: When the parts are in folded position, as indicated in dotted lines in Fig. II, the spring 15 presses the plungers 14 into contact with the flat surfaces 11 of the male hinge portions 7 and 8 thereby compensating for any looseness in the hinge pins 9 and 10 and retaining the lens frame and the eye ring in position until displaced for extension by a force greater than that exerted by the spring 15. When being extended for use the lens frame and the eye ring rotate about their pivots 9 and 10 respectively, the eccentric movement of the flat surfaces 11 pushing the plungers 14 toward each other; after the rounded shoulders 13 have been passed, the movement becomes a retiring one and the plungers 14 through the action of the spring 15 are pressed away from each other, following up the flat surfaces 12 until the extended position is reached where the flat surfaces 12 are normal to the longitudinal centerline of the connecting tube 4, as indicated in full lines in Fig. II, in which position the lens frame and eye ring are held against displacement in the manner previously described for the folded position. The rotation of the lens frame and the eye frame is limited to a position normal to the center line $x\,x$ as shown in Fig. II by the shoulders 16 of the hinge portions 7 and 8 coming into contact with the bottom of the recess between the ears 5 and 6 in the connecting tube 4. The flaring eye frame produces a sharp well defined gripping edge which enables the muscles about the eye to readily grasp and retain the ring. It is also to be noted that the eye frame may be made of elastic material, such as zylonite for instance, which when displaced slightly will exert an outward pressure tending to resume its normal position and thus aid the muscles in retaining the frame in place.

Having thus described my invention, the following is what I claim as new therein and desire to secure by Letters Patent:

1. A watchmaker's loupe comprising a tube having furcated ends, an eye piece and lens holder pivoted between the furcations at opposite ends of the tube, and means contained within and concealed by the tube for locking the eye frame and the lens frame in desired adjusted position.

2. An eye piece for a watch maker's loupe formed as a continuous annulus having a sharp gripping edge adapted, when it is distorted, to engage the facial muscles and retain the loop in position through the natural elasticity of the material from which it is formed.

3. An eye piece for a watch maker's loupe formed as a thin elastic continuous annulus whose basal diameter is greater than its top diameter, the exterior of the basal ring presenting a sharp gripping edge, said annulus being distortable and adapted to be brought into engagement with the facial muscles through the natural elasticity of the material from which it is formed.

4. A device of the character described comprising a frusto-conical eye engaging member provided with a sharp basal flesh gripping edge, said member having an offset lug secured thereto and projecting therebeyond, a lens bearing tube having a portion pivotally secured to the projecting lug of the eye member, and means contained within and concealed by the tube for locking the tube in adjusted position relative to the eye engaging member.

5. A watchmaker's loupe comprising a tube having furcated ends, an eye frame and a lens frame pivoted at opposite ends of the tube between the furcations in such a manner that the portions thereof pivoted between the furcations will contact with the tube to limit the opening movement of said parts to substantially parallel relation to each other, and means contained in the tube for locking the frames in open or folded position.

6. A watchmaker's loupe including a lens frame having a projecting lug, a tube pivotally secured to said lug, an eye piece of flexible material pivoted to the other end of the tube, and means inclosed and concealed within the tube for locking the lens frame and eye piece in adjusted position.

In testimony whereof I affix my signature in presence of two witnesses.

GEORGE H. DAY.

Witnesses:
REGINALD R. MILLER,
WILLIAM A. GUNNING.